United States Patent
Stoddart et al.

(10) Patent No.: US 9,527,146 B2
(45) Date of Patent: Dec. 27, 2016

(54) OSCILLATING SAW BLADES

(71) Applicant: Toronto Saw Works Inc., Toronto (CA)

(72) Inventors: Robin Stoddart, Toronto (CA); Carlton Chong, Toronto (CA)

(73) Assignee: TORONTO SAW WORKS INC., Toronto (CA)

( * ) Notice: Subject to any disclaimer, the term of this patent is extended or adjusted under 35 U.S.C. 154(b) by 114 days.

(21) Appl. No.: 14/045,980

(22) Filed: Oct. 4, 2013

(65) Prior Publication Data

US 2015/0096422 A1    Apr. 9, 2015

(51) Int. Cl.
   *B23D 61/00*    (2006.01)
(52) U.S. Cl.
   CPC ............ *B23D 61/006* (2013.01); *Y10T 83/935* (2015.04); *Y10T 83/9319* (2015.04)
(58) Field of Classification Search
   CPC ................................... B23D 6/00; B23D 6/006
   USPC ..................................................... 30/392–394
   See application file for complete search history.

(56) References Cited

U.S. PATENT DOCUMENTS

| | | | | |
|---|---|---|---|---|
| 149,120 A | * | 3/1874 | Hatch .................. | B23D 61/123 83/661 |
| 1,132,592 A | * | 3/1915 | Lewis .................... | B23D 65/00 123/1 R |
| 1,676,071 A | * | 7/1928 | Bolinder .............. | B23D 61/123 407/117 |
| 2,720,229 A | * | 10/1955 | Drake .................. | B23D 61/021 407/60 |
| 3,181,577 A | * | 5/1965 | Gaskins ............... | B23D 61/026 144/222 |
| 3,200,861 A | * | 8/1965 | Merz ..................... | B27B 33/141 29/455.1 |
| 3,346,025 A | * | 10/1967 | Anderson ............... | B27B 33/14 83/833 |
| 3,766,808 A |   | 10/1973 | Cremisio et al. | |

(Continued)

FOREIGN PATENT DOCUMENTS

| | | |
|---|---|---|
| DE | 202004007929 U1 | 7/2004 |
| DE | 102011103880 A1 | 11/2012 |

(Continued)

OTHER PUBLICATIONS

Corresponding PCT International Patent Application No. PCT/CA2014/000713, "International Search Report and Written Opinion" dated Dec. 23, 2014.

(Continued)

*Primary Examiner* — Jason Daniel Prone
*Assistant Examiner* — Richard Crosby, Jr.
(74) *Attorney, Agent, or Firm* — Perry + Currier Inc.

(57) ABSTRACT

A saw blade for an oscillating saw can include a plate having cutting teeth arranged in an arcuate tooth pattern at a cutting path. Cutting teeth on opposite sides of the centerline of the plate may be arranged to face oppositely. Each cutting tooth can have primary and secondary relief surfaces at different angles to the cutting path. Cutting teeth may be offset outwardly from the plate, with tips of some of the cutting teeth having outward-facing kerf surfaces parallel to the plate. The plate may be of bimetal construction, so that the cutting teeth and bulk of the plate are made of different materials. The cutting teeth may be formed by a coining process.

21 Claims, 7 Drawing Sheets

(56) References Cited

U.S. PATENT DOCUMENTS

| | | | | |
|---|---|---|---|---|
| 3,792,524 | A * | 2/1974 | Pomernacki | B23D 43/02 |
| | | | | 407/1 |
| 3,878,747 | A * | 4/1975 | Soderstrom | B23D 61/021 |
| | | | | 407/33 |
| 4,267,814 | A * | 5/1981 | Benson | B23D 61/021 |
| | | | | 125/15 |
| 4,407,178 | A * | 10/1983 | Storzer | B23D 61/025 |
| | | | | 83/835 |
| 4,426,900 | A * | 1/1984 | Lemery | B27B 33/142 |
| | | | | 83/833 |
| 4,930,487 | A * | 6/1990 | Younger | B23D 61/025 |
| | | | | 125/15 |
| 4,989,320 | A | 2/1991 | Borkott et al. | |
| 5,366,312 | A | 11/1994 | Raines | |
| 5,382,249 | A | 1/1995 | Fletcher | |
| 5,697,835 | A * | 12/1997 | Nitz et al. | 451/548 |
| 5,725,530 | A * | 3/1998 | Popken | 606/82 |
| 6,708,594 | B1 * | 3/2004 | Iinuma | B23D 61/021 |
| | | | | 83/835 |
| 7,998,158 | B2 | 8/2011 | Fletcher et al. | |
| 8,113,100 | B1 * | 2/2012 | Cranna et al. | 83/851 |
| 8,210,081 | B2 * | 7/2012 | Elliston et al. | 83/835 |
| 8,365,419 | B2 | 2/2013 | Bernardi et al. | |
| 2005/0211046 | A1 * | 9/2005 | Thomas et al. | 83/855 |
| 2005/0268898 | A1 * | 12/2005 | Bishop | B23D 61/026 |
| | | | | 125/13.01 |
| 2006/0162526 | A1 * | 7/2006 | Nagano et al. | 83/835 |
| 2009/0312762 | A1 | 12/2009 | Boykin | |
| 2010/0288099 | A1 | 11/2010 | Steiger | |
| 2011/0219929 | A1 * | 9/2011 | Mann | 83/607 |
| 2013/0133501 | A1 * | 5/2013 | Zhang | 83/697 |
| 2013/0204256 | A1 * | 8/2013 | Wang et al. | 606/82 |
| 2014/0190328 | A1 | 7/2014 | Karlen | |

FOREIGN PATENT DOCUMENTS

| | | |
|---|---|---|
| EP | 1208950 A1 | 5/2002 |
| EP | 1105265 B1 | 10/2011 |
| GB | 2345461 A | 7/2000 |
| WO | WO-2008151866 A1 | 12/2008 |

OTHER PUBLICATIONS

International Search Report dated Apr. 14, 2016 for International Application No. PCT/IB2016/050885.

Written Opinion dated Apr. 14, 2016 for International Application No. PCT/IB2016/050885.

* cited by examiner

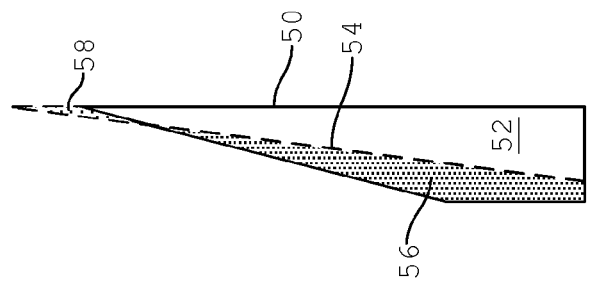
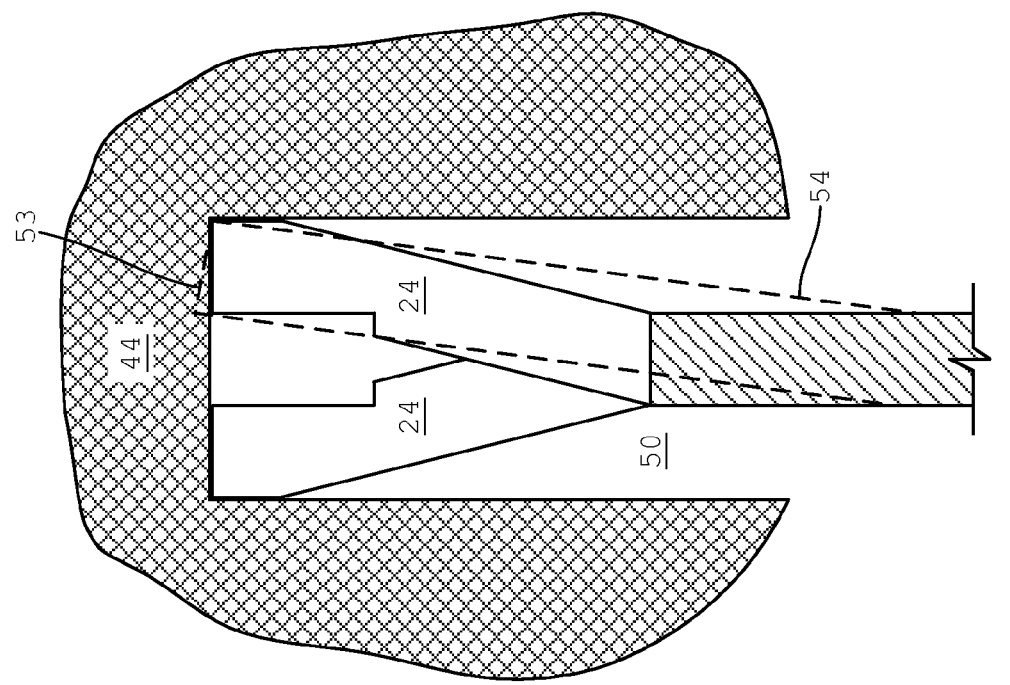

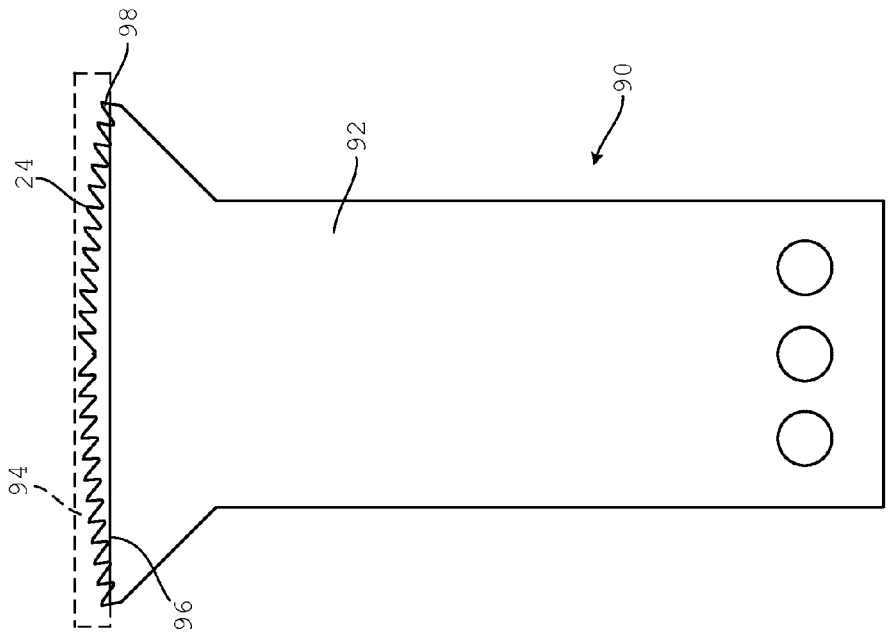
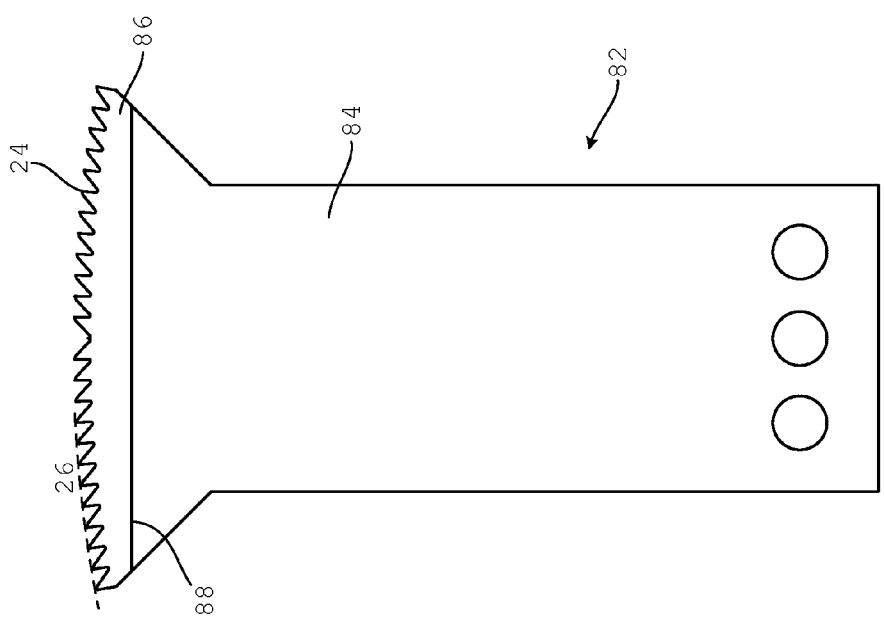

OSCILLATING SAW BLADES

FIELD

This disclosure relates to saw blades, more specifically, to saw blades for oscillating saws and processes of manufacturing same.

BACKGROUND

Oscillating saws operate by oscillating a blade having a short row of teeth. The teeth point in the direction of the material to be cut and are oscillated generally parallel to the surface of such material. Accordingly, the blade can be pushed perpendicularly into the material to perform what is known as a plunge cut.

Known blades for oscillating saws suffer from a number of drawbacks. In many styles of blade, the row of teeth is linear, but the blade is oscillated by rotation. Even when such rotation occurs over a small angular span and at a large radius, the blade often hammers the target material. That is, because the row of teeth is straight and tangential to the path of oscillation, each tooth is at a different distance from the center of oscillation and thus each tooth tends to have a component of motion that is perpendicular to the surface of the material being cut. Hammering increases towards the ends of the blades and can reduce cutting efficiency and add to physical stress on the operator.

Known blades may also have teeth that are oriented with cutting faces in the same direction, so that the blade only cuts in one direction. Resistance from the material being cut is thus unbalanced and this can lead to the blade pulling in the direction opposite the cutting faces. Moreover, at one end of the blade, the outermost tooth faces away from the material and thus does not cut effectively, and may hammer the material, cause undue heating, and prevent cuttings from being ejected efficiently or cause cuttings to be compacted.

It may also be the case that a blade is bent in the region of the teeth to reduce binding of the blade in the material being cut. A wave-like blade profile is often employed to provide an amount of kerf. However, wave-like profiles often extend a substantial distance towards the bulk of the blade, which consumes space that could otherwise be used to eject cuttings. The result may be reduced ejection of cuttings and increased heat accumulation.

Further, it is also known to make oscillating saw blades from sections of material also used to make band saw blades. The above drawbacks are frequently seen in such blades.

SUMMARY

According to one aspect of this disclosure, a saw blade for an oscillating saw includes a plate configured to be attached to an oscillating saw and oscillated about an axis of oscillation, and a plurality of cutting teeth arranged in an arcuate tooth pattern at an end of the plate to define a cutting path. The arcuate tooth pattern is centered at about the axis of oscillation. At least one cutting tooth of the plurality of cutting teeth has a rake surface and a primary relief surface that meet at a cutting lip. The primary relief surface forms an angle of between about 5 degrees and about 35 degrees with the cutting path. The at least one cutting tooth has a secondary relief surface extending from a trailing edge of the primary relief surface opposite the cutting lip. The secondary relief surface forms an angle of between about 30 degrees and about 50 degrees with the rake surface.

According to another aspect of this disclosure, a saw blade for an oscillating saw includes a plate having a planar front surface and a planar rear surface. The plate is configured to be attached to an oscillating saw and oscillated about an axis of oscillation. The saw blade further includes a plurality of cutting teeth arranged in an arcuate tooth pattern at an end of the plate to define a cutting path. The arcuate tooth pattern is centered at about the axis of oscillation. A tip of at least one cutting tooth of the plurality of cutting teeth has a kerf surface that is offset outwards from the planar front surface of the plate. The kerf surface is substantially parallel to the planar front surface of the plate. A tip of at least another cutting tooth of the plurality of cutting teeth has another kerf surface that is offset outwards from the planar rear surface of the plate. The other kerf surface is substantially parallel to the planar rear surface of the plate.

According to another aspect of this disclosure, a saw blade for an oscillating saw includes a plate configured to be attached to an oscillating saw and oscillated about an axis of oscillation, and a plurality of cutting teeth arranged in an arcuate tooth pattern at an end of the plate to define a cutting path. The arcuate tooth pattern is centered at about the axis of oscillation. Cutting teeth on opposite sides of a centerline of the plate face oppositely. Each of the plurality of cutting teeth has a primary relief surface ending at a cutting lip and a secondary relief surface extending from the primary relief surface opposite the cutting lip. The secondary relief surface is steeper than the primary relief surface with respect to the cutting path. Each of the plurality of cutting teeth has a tip that has a kerf surface that is offset outwards from the plate, the kerf surface being substantially parallel to the plate.

According to another aspect of this disclosure, a process of manufacturing a saw blade for an oscillating saw includes providing a plurality of cutting teeth to an end of a plate to define a cutting path, the plurality of cutting teeth arranged in an arcuate tooth pattern centered at about an axis of oscillation. Cutting teeth on opposite sides of a centerline of the plate face oppositely and at least one of the cutting teeth has a dual relief angle. The process further includes shaping another end of the plate opposite the cutting path for attachment to an oscillating saw, and coining the plurality of cutting teeth to be offset outwards from the plate.

According to another aspect of this disclosure, a saw blade includes a main plate made of a first material. The main plate is configured to be attached to an oscillating saw and oscillated about an axis of oscillation. The saw blade further includes a plurality of cutting teeth arranged in an arcuate tooth pattern at an end of the main plate to define a cutting path. The arcuate tooth pattern is centered at about the axis of oscillation. The plurality of cutting teeth include second material that is different from the first material.

BRIEF DESCRIPTION OF THE DRAWINGS

The drawings illustrate, by way of example only, embodiments of the present invention.

FIG. 7A is a section at S-S of FIG. 4 showing a profile of a known blade.

FIG. 7B is a diagram of a cuttings ejection area of the saw blade.

FIG. 9 is a plan view of a saw blade having bimetal construction.

FIG. 10 is a plan view of another saw blade having bimetal construction.

DETAILED DESCRIPTION

The drawbacks discussed above are addressed by saw blades and related processes discussed herein. As will be apparent to one of ordinary skill, adopting one or more of the techniques described herein can provide saw blades that cut faster and more efficiently, with less heat buildup and wear. Moreover, the manufacturing processes discussed herein allow saw blades with these improvements to be made efficiently and at high volumes.

Figure 1:
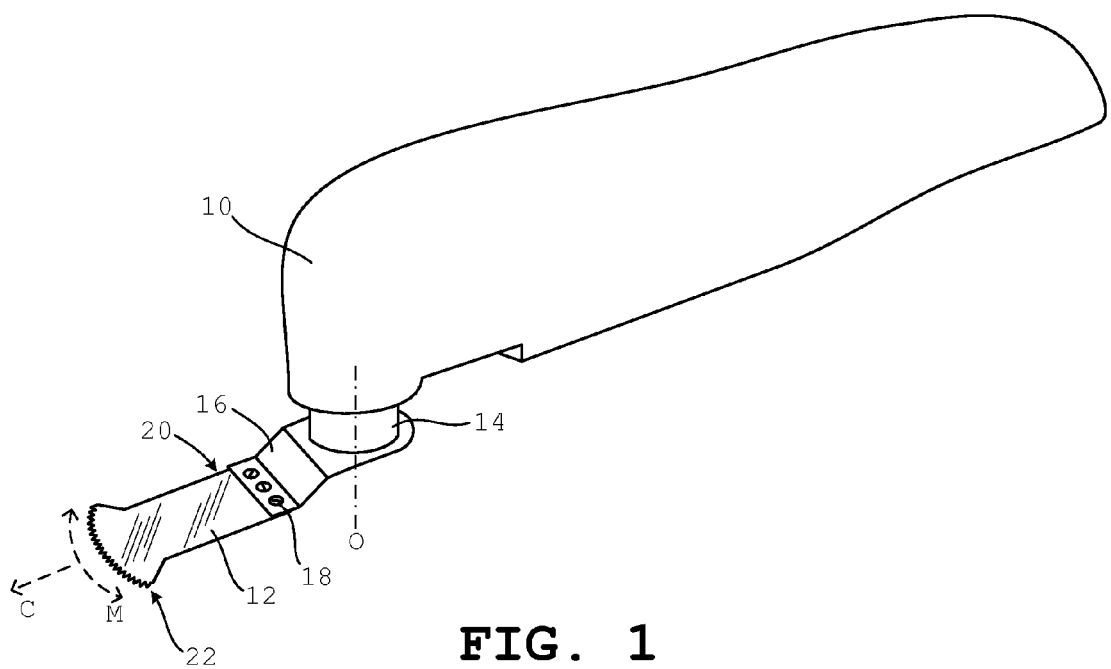
FIG. 1 is a perspective diagram of an oscillating saw with a saw blade attached.

FIG. 1 shows an oscillating saw 10 with a saw blade 12 according to an embodiment. The oscillating saw 10 may be electrically powered and may be of the kind used in the construction industry. The oscillating saw 10 may include an electric motor and gearing mounted within an outer housing. An on/off switch, oscillation frequency control, power cord, battery, depth stop, suction device for collecting cuttings, as well as other components may also be provided.

A hub 14 extends from the oscillating saw 10 and rotates about an axis of oscillation O in an oscillatory manner during operation of the saw 10. Depending on the specific saw 10, the hub 14 may oscillate through about three to five degrees of angular span at a frequency of about 30,000 oscillations per minute. Naturally, these numbers are merely examples and other angular spans and frequencies are also contemplated.

A tool holder 16 may extend from the hub 14 and may be configured to removably attach the saw blade 12 by way of, for example, fasteners such as screws, clamps, and the like, shown at 18. Alternatively, the saw blade 12 may attach directly to the hub 14, which can be achieved by, for example, providing the blade 12 with the holder 16 as a unitary piece; resistance spot welding, TIG welding, or GTAW welding the blade 12 to the holder 16; brazing or soldering the blade 12 to the holder 16; or using a cement or adhesive to attach the blade 12 to the holder 16. Accordingly, an end 20 of the saw blade 12 proximate the hub 14 is provided with one or more suitable fastening features, such as one or more openings.

The saw blade 12 includes as its body a flat plate. The end 22 of the saw blade 12 opposite the fastening feature includes a cutting path defined by a plurality of cutting teeth arranged in an arcuate tooth pattern. The arcuate tooth pattern follows a circular arc that is centered at about the axis of oscillation O. Such centering is approximate and minor variations can be tolerated provided that any resulting hammering can also be tolerated.

During operation, after the end 20 of the plate of the saw blade 12 is attached to the saw 10, the saw is powered and the blade 12 oscillates about the axis O causing the arcuate tooth pattern at the end 22 to follow an oscillating path M. Then, the saw 10 manually pushed in direction C, thereby causing the blade 12 to cut into the target material, which can include materials such as wood, synthetic materials, water pipe, sheet metal, and fasters attached to or embedded within such materials. Precise and efficient plunge cuts, in which the saw blade 12 enters the material perpendicular to the surface of the material, can thereby be performed.

Figure 2:
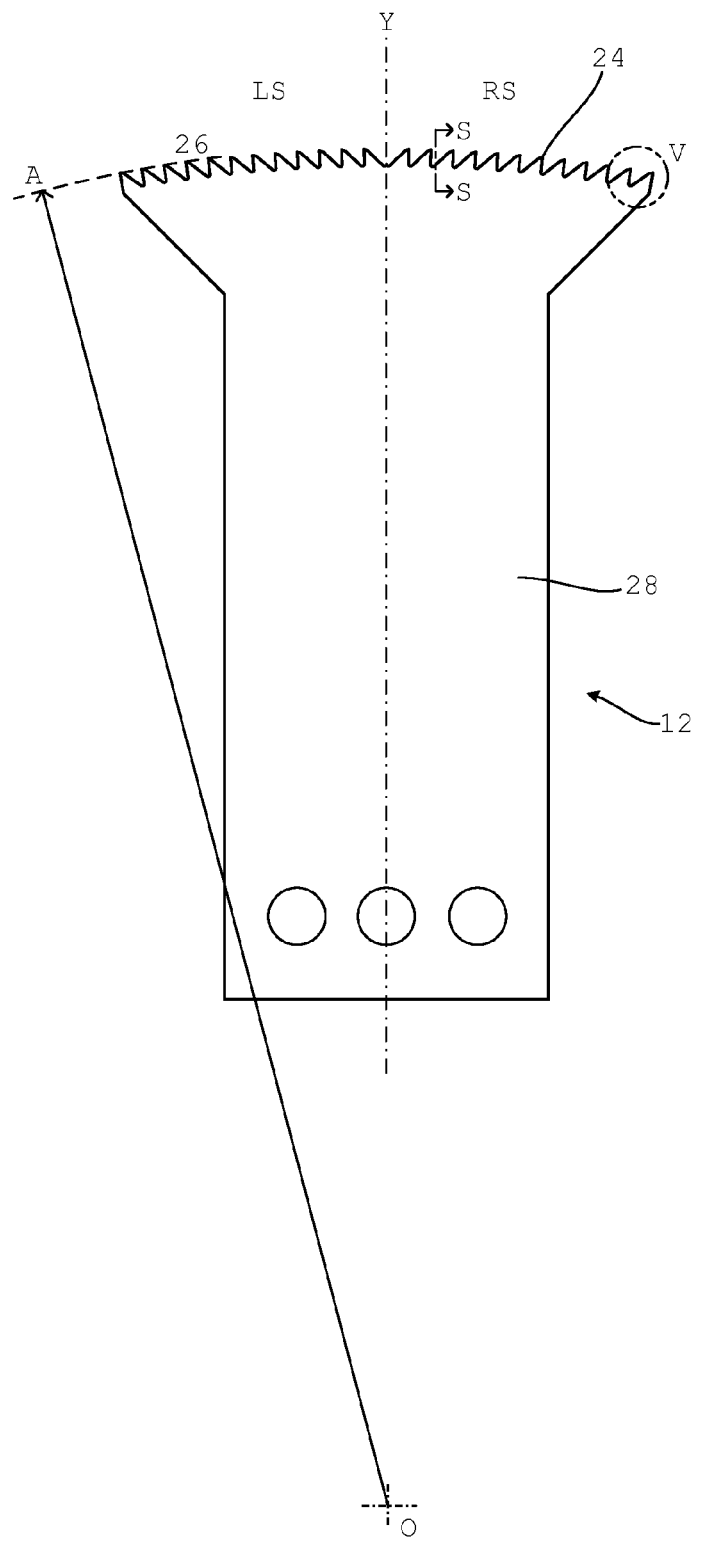
FIG. 2 is a plan view of the saw blade.

FIG. 2 shows the saw blade 12 removed from the saw 10. The saw blade is may be made from a flat plate having a planar front surface, shown, and a planar rear surface, opposite. The terms front and rear are used herein for sake of explanation and are not intended to be limiting to any particular orientation. The same applies to other directional terms such as right, rightwards, left, leftwards, top, bottom, and the like.

Suitable materials for the saw blade 12 include metals such as carbon steel, alloy steel, tool steel, high-speed steel, and similar materials. Other suitable materials for the saw blade 12 include carbides such as tungsten-carbide, titanium-carbide, tantalum-carbide, other cemented carbides, and similar materials.

The blade 12 has cutting teeth 24 arranged follow a circular arc A to define the cutting path 26. The arc A is sized and positioned such that the arcuate tooth pattern is centered at about the axis of oscillation O. Such an arcuate tooth pattern can present the target material with a consistent rake angle across substantially all teeth. Further, this can reduce or eliminate hammering that is often found in blades having teeth arranged along a straight line.

Cutting teeth 24 on opposite sides of a centerline Y of the plate 28 face oppositely, in that teeth 24 on the left side LS of the centerline Y face left and cut when the plate 28 rotates leftwards about the axis O and teeth 24 on the right size RS of the centerline Y face right and cut when the plate 28 rotates rightwards. This permits the blade 12 to cut in both directions as the blade 12 oscillates left and right, in contrast to some known blade designs that have all teeth facing the same direction. Further, because the outermost teeth each present a cutting face to the material being cut, lateral hammering and cutting compaction, as is often seen when a tooth is pushed backwards into material, are reduced or eliminated.

The number of cutting teeth 24 on each side of the centerline Y can be equal or approximately equal. More teeth on one side may cause the blade 12 to pull in the opposite direction. Hence, the specific numbers of teeth 24 on each side of the centerline Y can be selected accordingly, and need not be equal provided that any resulting pull can be tolerated.

The plurality of cutting teeth 24 can have a pitch of between about 14 teeth per inch (1.81 mm spacing) and about 32 teeth per inch (0.79 mm spacing). In this embodiment, the pitch is about 18 teeth per inch (1.41 mm spacing).

Figure 3:
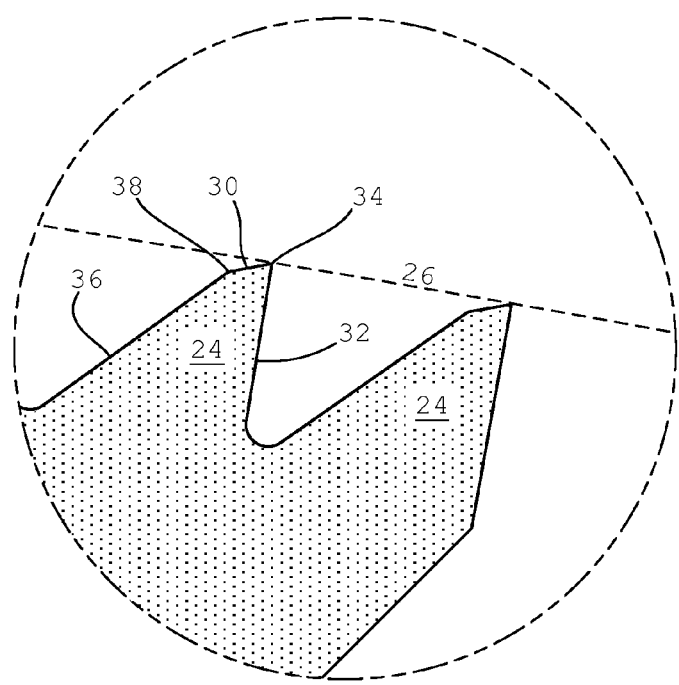
FIG. 3 is a close-up view of several teeth of the saw blade.

FIG. 3 shows a close-up view of several cutting teeth 24 shown in FIG. 2 at V.

Each of the cutting teeth 24 has a primary relief surface 30 and a rake surface 32 that meet at a cutting lip 34 that defines the cutting path 26 of the blade 12. Each tooth 24 also has a secondary relief surface 36 that extends from a trailing edge 38 of the primary relief surface 30, the trailing edge 38 being at an end of the primary relief surface 30 opposite the cutting lip 34.

As can be seen, the secondary relief surface 36 is steeper than the primary relief surface 30 with respect to the cutting path 26. That is, the primary relief surface 30 forms a primary angle with a tangent line of the cutting path 26 at the cutting lip 34, and the primary angle is shallower than a secondary angle between the secondary relief surface 36 and the tangent line of the cutting path 26. This may be known as a dual relief angle. Note that the tangent line is omitted from view for clarity, as it is approximately coincident with the cutting path 26 in this view.

A shallower primary angle between the primary relief surface 30 and the tangent line of the cutting path 26 can result in increased strength of the cutting lip 34, which can prolong the useful life of the blade 12 when cutting harder materials such as steel nails, screws, copper pipe, and the like. This may also be referred to as an increased wedge angle between the primary relief surface 30 and the rake surface 32. A reduced tendency for the blade to grab the material being cut and increased operator comfort may also result.

A steeper secondary angle between the secondary relief surface 36 and the tangent line of the cutting path 26 provides greater clearance for ejection of cuttings, which can reduce friction and reduce the likelihood of overheating or burning the material being cut.

The primary relief surface 30 and secondary relief surface 36 may each be flat, as illustrated. Such flatness permits these surfaces 30, 36 to be made relatively small while still providing the benefits mentioned above. Hence, the dual relief angle described above provides an efficient and manufacturable way to improving cutting performance, particularly at small tooth sizes.

Figure 4:
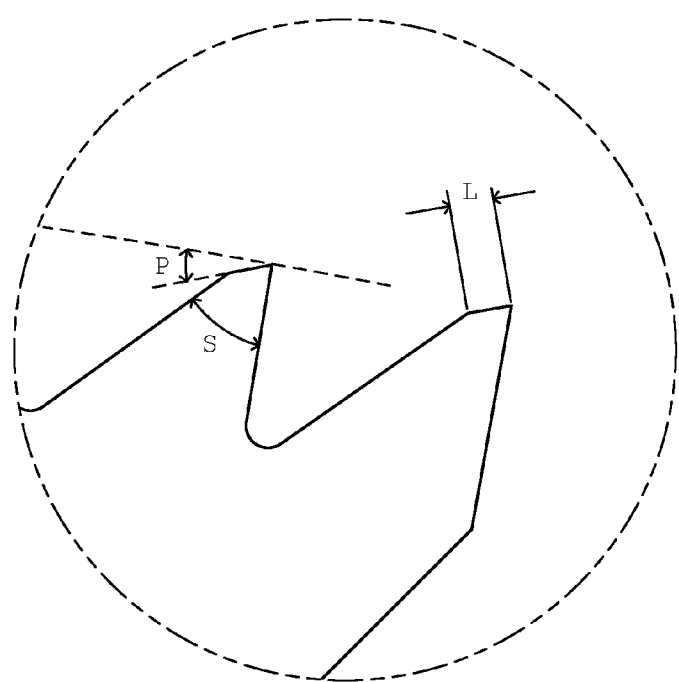
FIG. 4 is a close-up view of the several teeth of the saw blade showing dimensions.

FIG. 4 shows the same view as FIG. 3 showing example dimensions.

The primary relief surface 30 forms a primary angle P of between about 5 degrees and about 35 degrees with the tangent of the cutting path 26 at the cutting lip 34. In this embodiment, the primary angle P is about 20 degrees. The secondary relief surface 36 forms an angle S of between about 30 degrees and about 50 degrees with the rake surface 32, which may be approximately perpendicular to the tangent of the cutting path 26 at the cutting lip 34. In this embodiment, this angle is about 45 degrees. As mentioned above, such a dual relief angle may provide for greater cutting strength, less grabbing, increased operator comfort, and less frictional heat generation. These advantages are particularly evident when compared to a single relief surface that extends from the cutting lip at an angle of about 30 degrees from the cutting path tangent.

The land L of the primary relief surface 30 may extend from the cutting lip 34 to the trailing edge 38 for a distance of between about 5 thousandths of an inch (0.13 mm) and about 25 thousandths of an inch (0.64 mm). In this embodiment, the land L is about 15 thousandths of an inch (0.38 mm).

Figure 5:
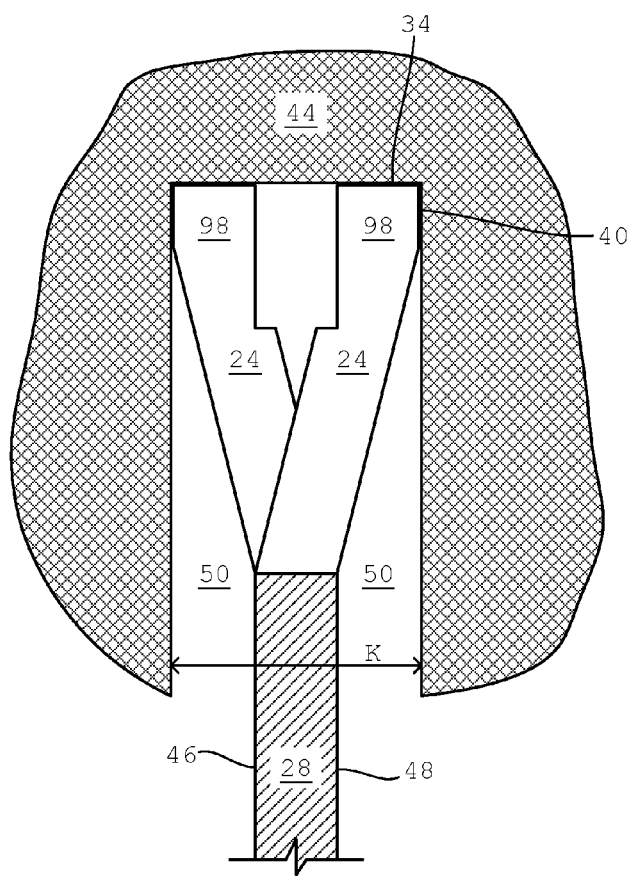
FIG. 5 is a section at S-S of FIG. 4 showing material being cut.

FIG. 5 shows the saw blade 12 as viewed from the end at section line S-S in FIG. 2.

As can be seen, each cutting tooth 24 has a kerf surface 40 at its tip 98. The cutting teeth 24 may be offset outwards, that is, frontwards and rearwards, from the plate 28. Cutting teeth 24 that are offset the most define a maximum kerf K within the material 44 being cut. The teeth 24 can be alternately offset frontwards and rearwards, such that each tooth 24 is offset opposite its immediate neighbours. Alternatively, groups of teeth 24 (e.g., groups of two adjacent teeth, five adjacent teeth, etc.) may be offset opposite to immediately neighbouring groups. As such, each kerf surface 40 is offset outwards from the respective planar front surface 46 or planar rear surface 48 of the plate 28. Each kerf surface 40 may be substantially parallel to the planar front surface 46 or planar rear surface 48. Further, each kerf surface 40 may be substantially at a right angle to the respective cutting lip 34, which may promote even wear of the cutting lip 34. Substantially all of the cutting teeth 24 may be offset by about the same maximum amount, frontwards or rearwards, that defines the maximum kerf K. Alternatively, cutting teeth 24 may be offset by different amounts up to the maximum amount that defines the maximum kerf K. For example, every fourth tooth 24 can be offset the maximum amount alternately frontwards and rearward, so that a set of six adjacent teeth 24 define a profile that has a first tooth 24 deformed the maximum amount frontwards, a fourth tooth 24 deformed the maximum amount rearwards, second and third intermediate teeth 24 deformed by lesser amounts (e.g., about ⅓ to ½ a distance between no deformation and the maximum amount) frontwards and rearwards, and fifth and sixth intermediate teeth 24 deformed by such lesser amounts as well. In any case, as with cutting teeth 24 offset the maximum amount, cutting teeth 24 offset less than the maximum amount may still have the planar kerf surface 40 and perpendicular cutting lip 34. The cutting teeth 24 may be offset in this way by a coining operation.

Regarding substantially parallel and substantially at a right angle, some deviation from parallel and right angle can be tolerated, provided that any resulting decrease in performance can be tolerated.

In this embodiment, all of the cutting teeth 24 are offset outwardly from the plate 28. In other embodiments, fewer than all of the cutting teeth 24 may be offset outwardly from the plate 28, as long as the expected reduction in cuttings ejection efficiency can be tolerated.

Figure 6:
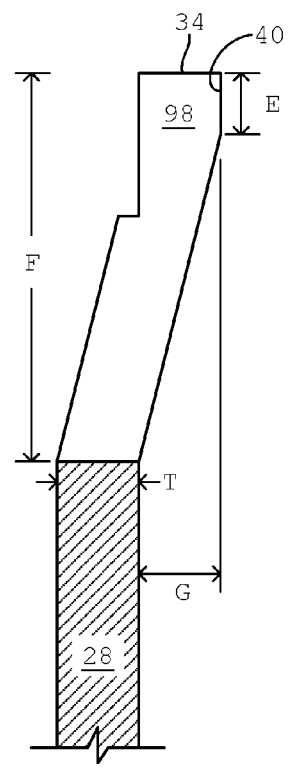
FIG. 6 is an end view of a tooth showing dimensions.

FIG. 6 shows one of the teeth 24 in isolation. Each kerf surface 40 can extend from the cutting path or cutting lip 34 towards the axis of oscillation O (FIG. 2) for a length E, which can be at least one sixth of a thickness T of the plate 28 at the teeth. In this embodiment, length E is about one half of the plate thickness T. The length of the deformed portion of the cutting tooth 24 that is outwardly offset may be limited to length F, which can be between about one half and about three and a half times the thickness T of the plate 28, which may improve cuttings ejection when compared to known gently bent teeth that have deformed portions extending greater than this limit (e.g., four times the plate thickness or greater). In this embodiment, the lengths F of the deformed portions of the cutting teeth 24 are about two and a half times the plate thickness T. The maximum amount of offset of a tooth 24 may be limited to an offset G of between about one quarter to about one half the plate thickness, which can advantageously limit the maximum kerf K to be between about one and a half times to about twice the thickness T of the plate 28. In this embodiment, offset G is about one quarter the plate thickness.

In one example, the plate 28 is 30 thousandths of an inch (0.76 mm) thick in the region of the cutting teeth 24. Hence, kerf surface 40 length E is about 15 thousandths of an inch (0.38 mm), the lengths F of the deformed portions of the cutting teeth 24 are about 75 thousandths of an inch (1.91 mm), and the maximum offset G of tooth deformation is about 7.5 thousandths of an inch (0.19 mm), which results in a maximum kerf K of about 45 thousandths of an inch (1.14 mm). In other examples, the plate thickness T ranges from about 20 thousandths of an inch (0.51 mm), to maintain suitable strength and rigidity, to about 50 thousandths of an inch (1.27 mm) or thicker, provided that the additional driving power required is available.

As shown in FIGS. 5 and 7A-7B, the offset cutting teeth 24 define cuttings ejection areas 50 on either side of the blade 12, which together represent a total volume through which cuttings can be ejected from the slot being cut into the material 44. The cutting ejection area 50 of the blade 12 is significantly larger than that of known blades that have teeth offset by shallower angles, gradual curves, or similar geometry. This is illustrated in FIGS. 7A-7B. FIG. 7A shows the view of FIG. 5 with a known blade profile 54 in dashed line. As can be seen, the known blade profile 54 is relatively gentle and lacks the kerf surface 40. It also tends to contact the material 44 being cut at an angle 53, which tends to result in uneven tip wear that can reduce the effective life of the blade. FIG. 7B shows that a known cuttings ejection area 52 defined by the known blade profile 54 is substantially smaller than the cutting ejection area 50 of the blade 12. Specifically, the cutting ejection area 50 is larger than a known cuttings ejection area 52 because of additional area 56 representative of the relative steepness of the coined bend of the cutting tooth 24 as compared to the more gradual known blade profile 54, despite the known blade profile 54 providing for somewhat additional area 58 near the cutting lip 34. That is, cuttings ejection area 50 of the saw blade 12 is larger than the cuttings ejection area of a comparable known blade by an amount equal to area 56 less area 58. Such an increased amount space for ejection of cuttings may allow for faster cutting, less heat generation, and reduced blade wear of the cutting teeth 24, despite the conventional wisdom of gently bending the teeth and providing cuttings ejection area 58 at their tips.

Figure 8:
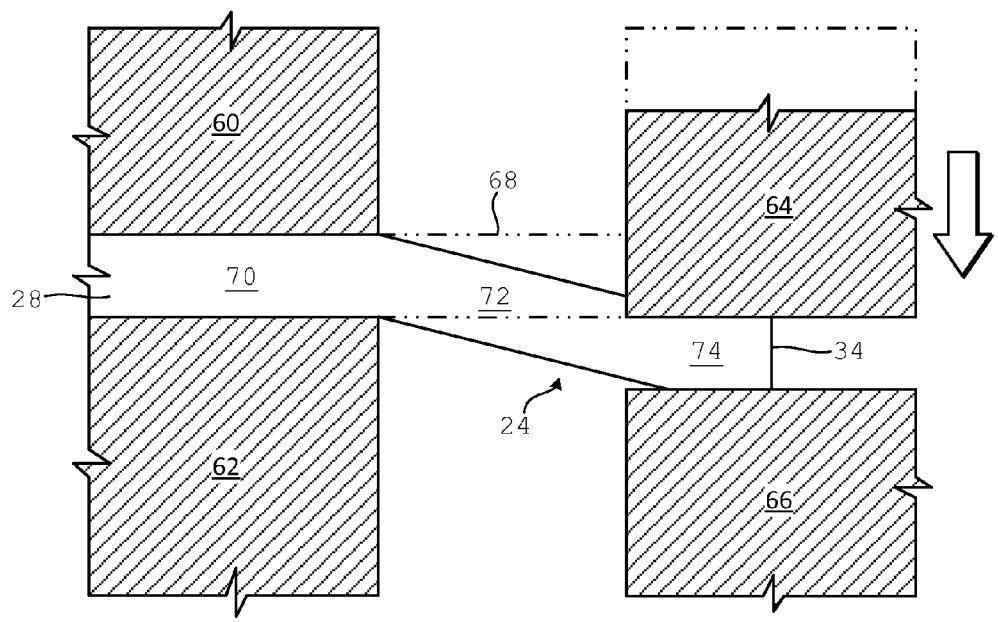
FIG. 8 is a diagram of a coining operation for manufacturing the saw blade.

FIG. 8 illustrates a coining operation that can be used in a process for manufacturing the saw blade 12.

Initially, a plurality of cutting teeth 24 may be machined, stamped, or otherwise provided to an end of a plate 28 in an arcuate tooth pattern centered at about an axis of oscillation O (FIG. 2). Features of the teeth 24, such as opposite facings and dual relief angles, may be as discussed elsewhere herein. An opposite end of the plate 28 may be shaped for attachment to an oscillating saw 10 (FIG. 1), which may include providing holes or other feature for receiving screws 18 or other fastener. Alternatively, the opposite end of the plate 28 can be permanently attached, as discussed above, by spot welding, brazing, soldering, adhesive or cement, or the like, and holes or other feature may not be required.

A coining operation can be performed, in which each of the plurality of cutting teeth 24 is coined outwards. A punch including clamp parts 60, 62, a hammer 64, and an anvil 66 can be used. The plate 28 is gripped between the clamp parts 60, 62 such that the cutting tooth or teeth 24 to be coined are held a distance above the anvil 66. The hammer 64 is then brought down onto the tooth or teeth 24 to plastically deform the tooth or teeth 24 from an initial, flat shape 68 to a final, coined shape. The hammer 64 and anvil 66 may have complementary profiles configured to coin all or substantially all cutting teeth 24 to be offset outwards from the plate 28 in a single drop of the hammer 64. Alternatively, a coining operation can be repeated until all or substantially all cutting teeth 24 are offset outwards from the plate 28. The clamp parts 60, 62, hammer 64, and anvil 66 may be referred to as a die.

As shown in FIG. 8, the coining operation results in the plate 28 taking a deformed shape in the region of the cutting teeth 24. Specifically, the plate 28 includes a non-deformed portion 70 representing the bulk of the plate 28, a bent portion 72 over which the cutting tooth 24 extend outwardly, and a deformed portion 74 directly pinched by the hammer 64 and anvil 66. Material at surfaces of the deformed portion 74 and part of or all of the bent portion 72 undergo plastic flow.

It should also be noted that the hammer 64 and anvil 66 may be specifically shaped to provide the specific sizes and shapes to the kerf surface 40 and cutting lip 34 discussed elsewhere herein. Further, coining the teeth 24 allows for a smaller deformed portion, which can help achieve the larger cuttings ejection area 50 discussed with respect to FIG. 7.

With reference to FIG. 9, a saw blade 82 may be made from two different materials. The saw blade 82 is similar to the saw blade 12 and the above description of the saw blade 12 may be referenced, particularly for features with like reference numerals. For sake of clarity, only differences between the saw blade 82 and the saw blade 12 will be discussed in detail.

The saw blade 82 includes a main plate 84 and a tooth plate 86 made of different materials. The tooth plate 86 is welded or otherwise heat joined to the main plate 84 at a linear joint 88. This can be achieved by laser welding, electron beam welding, or similar process. Although the cutting path 26 is arc-shaped, the linear joint 88 is straight, which may improve ease and speed of manufacture. The cutting teeth 24 may be formed in the tooth plate 86 as discussed elsewhere herein before or after the tooth plate 86 is attached to the main plate 84. In this embodiment, the entirety of each cutting tooth 24 is provided on the tooth plate 86.

The cutting teeth 24 are made from material different from material of the main plate 84. For example, the tooth plate 86 and cutting teeth 24 may be made of high-speed steel for improved cutting speed and wear resistance, while the main plate 84 may be made of carbon steel for ease of manufacture and reduced cost.

FIG. 10 shows another saw blade 90 made from two different materials. The saw blade 90 is similar to the saw blade 82 and the above description of the saw blade 82 may be referenced, particularly for features with like reference numerals. For sake of clarity, only differences between the saw blade 90 and the saw blade 82 will be discussed in detail.

The saw blade 90 is made from a main plate 92 and a tooth plate 94 made of different materials. The tooth plate 94 is welded or otherwise heat joined to the main plate 92 at a linear joint 96 before the cutting teeth 24 are formed. The cutting teeth 24 are formed in the tooth plate 94 as discussed elsewhere herein after the tooth plate 94 is attached to the main plate 84. The entirety of each cutting tooth 24 need not be made of the material of the tooth plate 94. Rather, at least the tip 98 of each cutting tooth 24 is made of the material of the tooth plate 94. Hence, as the cutting teeth 24 are machined or otherwise formed, material of the main plate 92 may also be removed. This technique can increase the speed and ease of manufacture of the saw blade 90 and reduce the amount of tooth plate material needed, both of which may reduce cost.

In other embodiments, selected features described above are provided to a saw blade. For instance, in one such embodiment, the dual relief angle is provided to the cutting teeth and coining is not used. In another such embodiment, cutting teeth are provided with a single relief angle and coining is used. In yet another embodiment, cutting teeth with dual relief angles or single relief angles are made of material different from a main plate to which they are attached, and the cutting teeth are arranged in an arcuate pattern.

While the foregoing provides certain non-limiting example embodiments, it should be understood that combinations, subsets, and variations of the foregoing are contemplated. The monopoly sought is defined by the claims.

What is claimed is:

1. A saw blade for an oscillating saw, the saw blade comprising:
    a plate configured to be attached to an oscillating saw and oscillated about an axis of oscillation, the plate having a planar front surface and a planar rear surface; and a plurality of cutting teeth arranged in an arcuate tooth pattern at an end of the plate to define a cutting path, the arcuate tooth pattern centered at about the axis of oscillation;

at least one cutting tooth of the plurality of cutting teeth having a rake surface and a primary relief surface that meet at a cutting lip, the primary relief surface forming an angle of between 5 degrees and 35 degrees with the cutting path, the at least one cutting tooth having a secondary relief surface extending from a trailing edge of the primary relief surface opposite the cutting lip, the secondary relief surface forming an angle of between 30 degrees and 50 degrees with the rake surface;

a tip of the at least one cutting tooth of the plurality of cutting teeth having a kerf surface that is offset outwards from the planar front surface of the plate, the kerf surface further being substantially parallel to the planar front surface of the plate, the kerf surface extending from the cutting path towards the axis of oscillation by a length of less than twice a thickness of the plate at the plurality of cutting teeth.

2. The saw blade of claim 1, wherein a land of the primary relief surface extends from the cutting lip to the trailing edge for a distance of between 5 thousandths of an inch and 25 thousandths of an inch.

3. The saw blade of claim 1, wherein the plurality of cutting teeth have a pitch of between 14 teeth per inch and 32 teeth per inch.

4. The saw blade of claim 1, wherein the plate has a centerline that extends between the axis of oscillation to the plurality of cutting teeth and that lies within a plane of the plate, wherein a left-facing set of teeth of the plurality of cutting teeth on a left side of the centerline of the plate face left to cut with respect to left rotation of the plate in its plane about the axis of oscillation by the oscillating saw, and a right-facing set of teeth of the plurality of cutting teeth on a right side of the centerline of the plate face right to cut with respect to the right rotation of the plate in its plane about the axis of oscillation by the oscillating saw.

5. The saw blade of claim 1, wherein the plate comprises a tooth plate having the plurality of cutting teeth and a main plate, the tooth plate and main plate joined at a straight joint.

6. The saw blade of claim 1, wherein the plurality of cutting teeth are welded to the plate.

7. A saw blade for an oscillating saw, the saw blade comprising:
   a plate having a planar front surface and a planar rear surface, the plate configured to be attached to an oscillating saw and oscillated about an axis of oscillation; and
   a plurality of cutting teeth arranged in an arcuate tooth pattern at an end of the plate to define a cutting path, the arcuate tooth pattern centered at about the axis of oscillation;
   a tip of at least one cutting tooth of the plurality of cutting teeth having a kerf surface that is offset outwards from the planar front surface of the plate, the kerf surface further being substantially parallel to the planar front surface of the plate, the kerf surface extending from the cutting path towards the axis of oscillation by a length of less than twice a thickness of the plate at the plurality of cutting teeth;
   a tip of at least another cutting tooth of the plurality of cutting teeth having another kerf surface that is offset outwards from the planar rear surface of the plate, the other kerf surface further being substantially parallel to the planar rear surface of the plate, the other kerf surface extending from the cutting path towards the axis of oscillation by a length of less than twice a thickness of the plate at the plurality of cutting teeth.

8. The saw blade of claim 7, wherein each of the kerf surfaces extend from the cutting path towards the axis of oscillation for a distance of at least one sixth of a thickness of the plate.

9. The saw blade of claim 7, wherein at least some of the plurality of cutting teeth are formed with a coining operation that outwardly offsets the kerf surfaces from the planar front and rear surfaces of the plate.

10. The saw blade of claim 7, wherein the plurality of cutting teeth have a pitch of between 14 teeth per inch and 32 teeth per inch.

11. The saw blade of claim 7, wherein outwardly offset portions of the at least one cutting tooth and the at least another cutting tooth have lengths of no greater than about three and a half times a thickness of the plate.

12. The saw blade of claim 7, wherein the plate has a centerline that extends between the axis of oscillation to the plurality of cutting teeth and that lies within a plane of the plate, wherein a left-facing set of teeth of the plurality of cutting teeth on a left side of the centerline of the plate face left to cut with respect to left rotation of the plate in its plane about the axis of oscillation by the oscillating saw, and a right-facing set of teeth the plurality of cutting teeth on a right side of the centerline of the plate face right to cut with respect to right rotation of the plate in its plane about the axis of oscillation by the oscillating saw.

13. The saw blade of claim 7, wherein the plate comprises a tooth plate having the plurality of cutting teeth and a main plate, the tooth plate and main plate joined at a straight joint.

14. The saw blade of claim 7, wherein the plurality of cutting teeth are welded to the plate.

15. A saw blade for an oscillating saw, the saw blade comprising:
   a plate configured to be attached to an oscillating saw and oscillated about an axis of oscillation; and
   a plurality of cutting teeth arranged in an arcuate tooth pattern at an end of the plate to define a cutting path, the arcuate tooth pattern centered at about the axis of oscillation, cutting teeth on opposite sides of a centerline of the plate facing oppositely;
   each of the plurality of cutting teeth having a primary relief surface ending at a cutting lip and a secondary relief surface extending from the primary relief surface opposite the cutting lip, the secondary relief surface being steeper than the primary relief surface with respect to the cutting path;
   each of the plurality of cutting teeth having a tip that has a kerf surface that is offset outwards from the plate, the kerf surface being substantially parallel to the plate, the kerf surface extending from the cutting path towards the axis of oscillation by a length of less than twice a thickness of the plate at the plurality of cutting teeth.

16. The saw blade of claim 15, wherein the primary relief surface forms an angle of between 5 degrees and 35 degrees with the cutting path, and each of the plurality of cutting teeth has a rake surface that meets the primary relief surface at the cutting lip, the secondary relief surface extending from a trailing edge of the primary relief surface opposite the cutting lip and the secondary relief surface forming an angle of between 30 degrees and 50 degrees with the rake surface.

17. The saw blade of claim 16, wherein a land of the primary relief surface extends from the cutting lip to the trailing edge for a distance of between 5 thousandths of an inch and 25 thousandths of an inch.

18. The saw blade of claim 17, wherein each kerf surface extends from the cutting path towards the axis of oscillation for a distance of at least one sixth of a thickness of the plate.

19. The saw blade of claim 18, wherein the plate comprises a tooth plate having the plurality of cutting teeth and a main plate, the tooth plate and main plate joined at a straight joint.

20. The saw blade of claim 7, wherein the kerf surface extends from the cutting path towards the axis of oscillation by a length of less than a thickness of the plate at the plurality of cutting teeth.

21. The saw blade of claim 7, wherein the kerf surface extends from the cutting path towards the axis of oscillation by a length of one half a thickness of the plate at the plurality of cutting teeth.

* * * * *